United States Patent Office

3,567,780
Patented Mar. 2, 1971

3,567,780
SUBSTITUTED METHYL-BUTYL-4-ONE SULFONES AND METHYL-BUTYL-2-ONE SULFONES
Jacques Martel, Bondy, and Chanh Huynh, Villemomble, France, assignors to Roussel-UCLAF, Paris, France
No Drawing. Original application June 30, 1965, Ser. No. 468,625, now Patent No. 3,398,160, dated Aug. 20, 1968. Divided and this application Apr. 8, 1968, Ser. No. 761,353
Claims priority, application France, July 3, 1964, 980,627
Int. Cl. C07c *49/76, 49/80*
U.S. Cl. 260—590        4 Claims

ABSTRACT OF THE DISCLOSURE

This invention relates to linear sulfones selected from the group consisting of (A) compounds of the formula

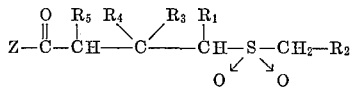

and (B) compounds of the formula

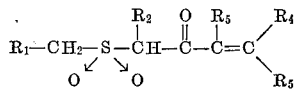

wherein $R_1$ and $R_2$ are members selected from the group consisting of hydrogen, vinyl, substituted vinyl, phenyl and substituted phenyl; $R_3$ and $R_4$ are members selected from the group consisting of hydrogen, alkyl, aralkyl, aryl and substituted aryl, and cycloalkyl having three to seven carbon atoms; $R_5$ is a member selected from the group consisting of hydrogen and lower alkyl; and Z is a member selected from the group consisting of R and OR, wherein R is a member selected from the group consisting of alkyl, aralkyl and aryl. These linear sulfones are useful as intermediates in the preparation of derivatives of tetrahydrothiapyran.

PRIOR APPLICATION

This application is a divisional application of our co-pending U.S. patent application Ser. No. 468,625, filed June 30, 1965, now U.S. Pat. No. 3,398,160.

This prior application relates to the derivatives of tetrahydrothiapyran which present a biological activity which renders them utilizable in agriculture and in industry. They can be utilized as pesticides (insecticides, herbicides, fungicides) in the customary pesticides formulations and as stabilizers of polyvinyl chloride in the presence of dibutyl tin salts.

An object of the present invention is the obtention of a tetrahydrothiapyran-1,1-dioxide of the formula

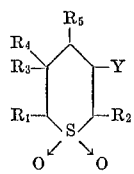

wherein $R_1$ and $R_2$ are members selected from the group consisting of hydrogen, vinyl, substituted vinyl, phenyl and substituted phenyl; $R_3$ and $R_4$ are members selected from the group consisting of hydrogen, alkyl, aralkyl, aryl, substituted aryl, and, when taken together, form a ring containing from three to seven carbon atoms; $R_5$ is a member selected from the group consisting of hydrogen and lower alkyl; and Y is a member selected from the group consisting of (1)

wherein R is a member selected from the group consisting of alkyl, aralkyl and aryl, and (2) O; with the proviso that when Y is 0, at least one of $R_1$, $R_2$, $R_3$, $R_4$ and $R_5$ is óther than hydrogen.

Another object of the present invention is the obtention of a tetrahydrothiapyran-1,1-dioxide of the formula

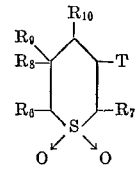

wherein $R_6$ and $R_7$ are members selected from the group consisting of hydrogen, lower-$\Delta^1$-alkenyl, phenyl, lower-alkyl-phenyl, halophenyl and lower-alkoxy-phenyl; $R_8$ and $R_9$ are members selected from the group consisting of hydrogen, lower alkyl, phenyl-lower-alkyl, phenyl, lower-alkyl-phenyl, halophenyl, lower-alkoxy-phenyl, and, when taken together, alkylene having from three to seven carbon atoms; $R_{10}$ is a member selected from the group consisting of hydrogen and lower alkyl; and T is a member selected from the group consisting of (1)

wherein $R_{11}$ is a member selected from the group consisting of lower alkyl, phenyl-lower-alkyl, phenyl, lower-alkyl-phenyl, halophenyl and lower-alkoxy-phenyl, and (2) O; with the proviso that when T is 0, at least one of $R_6$, $R_7$, $R_8$, $R_9$ and $R_{10}$ is other than hydrogen.

A yet further object of the present invention is the development of a process for the preparation of a tetrahydrothispyran-1,1-dioxide of the formula

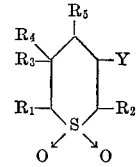

wherein $R_1$ and $R_2$ are members selected from the group consisting of hydrogen, vinyl, substituted vinyl, phenyl and substituted phenyl; $R_3$ and $R_4$ are members selected from the group consisting of hydrogen, alkyl, aralkyl, aryl, substituted aryl, and, when taken together, form a ring containing from three to seven carbon atoms; $R_5$ is a member selected from the group consisting of hydrogen and lower alkyl; and Y is a member selected from the group consisting of

wherein R is a member selected from the group consisting of alkyl, aralkyl and aryl, and (2) O; with the proviso that when Y is 0, at least one of $R_1$, $R_2$, $R_3$, $R_4$ and $R_5$ is other than hydrogen, which comprises the steps of reacting a sulfone of the formula

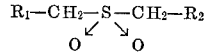

wherein $R_1$ and $R_2$ have the above-indicated meanings, with an $\alpha,\beta$-ethylenic compound of the formula

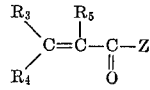

wherein $R_3$, $R_4$ and $R_5$ have the above-indicated meanings and Z is a member selected from the group consisting of R, where R has the above-indicated meaning, and OR, wherein R has the above-indicated meaning, in an anhydrous organic media in the presence of a basic condensation agent, and recovering said tetrahydrothiapyran-1,1-dioxide.

Another object of the present invention is the obtention of the novel intermediates:

(A) A linear sulfone of the formula

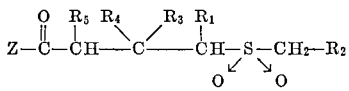

wherein $R_1$ and $R_2$ are members selected from the group consisting of hydrogen, vinyl, substituted vinyl, phenyl and substituted phenyl; $R_3$ and $R_4$ are members selected from the group consising of hydrogen, alkyl, aralkyl, aryl, substituted aryl, and, when taken together, form a ring containing from three to seven carbon atoms; $R_5$ is a member selected from the group consisting of hydrogen and lower alkyl; and Z is a member selected from the group consisting of R and OR, wherein R is a member selected from the group consisting of alkyl, aralkyl and aryl.

(B) A linear sulfone of the formula

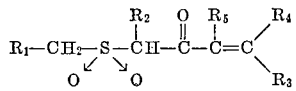

wherein $R_1$ and $R_2$ are members selected from the group consisting of hydrogen, vinyl, substituted vinyl, phenyl and substituted phenyl; $R_3$ and $R_4$ are members selected from the group consisting of hydrogen, alkyl, aralkyl, aryl, substituted aryl, and, when taken together, form a ring containing from three to seven carbon atoms; $R_5$ is a member selected from the group consisting of hydrogen and lower alkyl.

These and other objects of the invention will become more apparent as the description thereof proceeds.

The process of preparation of the new tetrahydrothiapyran - 1,1 - dioxides of Formula I equal the object of the present invention is shown in the following flow diagram:

TABLE

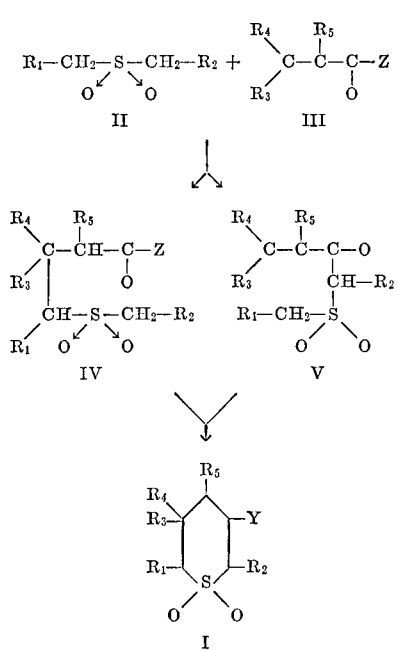

$R_1$, $R_2$, $R_3$, $R_4$, $R_5$, Y and Z have the above-indicated meanings.

The said process is characterized in that one reacts in an anhydrous media, a sulfone of the general Formula II:

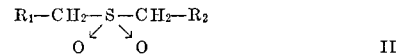

wherein $R_1$ and $R_2$ have the above-noted significance with an $\alpha,\beta$-ethylenic ketone or ester of the general Formula III:

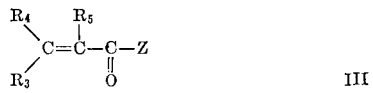

wherein $R_3$, $R_4$ and $R_5$ have the above-noted significance and where Z represents the group R or OR, R having the significance above noted in the presence of a basic condensation agent, obtaining as an intermediate a linear sulfone which is not isolated but which is transformed by cyclization in the same media into the corresponding cyclic sulfone of the general Formula I.

In a variant of this process the linear intermediate sulfone is isolated and purified, then cyclized in a basic media into the corresponding cyclic sulfone of general Formula I.

The mechanism of the formation of the cyclic sulfone I starting from sulfone II and the ethylenic compound III gives rise to a discussion on the very nature of the mechanism of the reaction and by way of consequence on the structure of the intermediate sulfone.

In the case where the starting compound III is an $\alpha,\beta$-ethylenic ketone (Z=R), it is probable that the formation of the cyclic sulfone I proceeds in two steps. In the first step a conjugated addition of the sulfone II to the ketone III takes place to give thus rise to the obtention of the linear sulfone IV where Z=R. This latter compound in a second step is cyclized into a $\beta$-hydroxylated sulfone

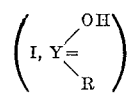

by nucleophilic attack of the carbonyl function. The possible isolation of the intermediary sulfone IV depends naturally on the structure of the reactants utilized and the operatory conditions.

In the case where the starting compound III is an $\alpha,\beta$-ethylenic ester (Z=R), two different mechanisms appear, a priori, possible. There can be first, as in the case hereabove, a conjugated addition of the sulfone II to the ester III and obtention of the linear sulfone IV (Z=OR), then by nucleophilic attack on the carboxyl group, cyclization into sulfone (I, Y=O). It is also possible that the formation of this $\beta$-ketonic sulfone can proceed in an inverse order. First, condensation of the ester III with the sulfone II and obtention of the intermediate linear sulfone V, then cyclization of this latter compound into sulfone (I, Y=O) by the addition of a 1–4 intramolecular type.

Here also, the structure of the starting compounds II and III and the operatory conditions must have an influence on the nature of the mechanism and on the possibilities of the separation of the intermediaries IV or V.

It is to be understood these theoretical discussions limit in no fashion the breadth of the invention.

The reaction between the sulfone II and the ethylenic compound III is effected in an anhydrous media in the presence of a basic condensation agent, for example, an alkali metal alcoholate, preferably an alkali metal lower alkanolate such as sodium methylate or potassium t.-butylate, sodium amide sodium hydride or sodium dimsyl.

As an anhydrous media or solvent, one can utilize particularly an aromatic hydrocarbon such as benzene or toluene, a lower alkanol such as methanol or ethanol, a linear or cyclic ether, particularly a di-lower-alkyl ether such as ethyl ether or a lower alkylene oxide such as tetrahydrofuran, a substituted amide, particularly a di-lower-alkyl-amide of a lower alkanoic acid such as dimethylformamide, or dimethylsulfoxide.

In a method of executive actually preferred for the preparation of the cyclic sulfones I without isolation of the intermediary sulfone or sulfones, the reaction is conducted at a temperature in the neighborhood of 0° C. in anhydrous tetrahydrofuran and in the presence of an excess of potassium t.-butylate.

In certain experiments of the condensation of the sulfone II with the ethylenic compound III, it has been effectively possible to isolate an intermediary sulfone, either IV or V. For this object it is advantageous, in order to avoid subsequent cyclization of the intermediate sulfone into the cyclic sulfone I, to operate in the presence of a lesser amount of the basic condensation agent, for example with less than 1 molar equivalent per mols of the reactants. This rule is not general, however, and the factors favoring the isolation of intermedaite sulfones IV or V depend manifestly on the structure of the compounds being reacted.

In addition it has been shown that the intermediate sulfones IV and V in the case where they have been effectively isolated and purified, can be brought into reaction in a basic condensation media in order to form the corresponding cyclic sulfone I. The operatory conditions of this reaction are analogous to those of the formation of the cyclic sulfone I, starting from II and III without the intermediary isolation of intermediate sulfone IV or V. One can, for example, utilize as basic condensation agent, potassium t.-butylate in solution in tetrahydrofuran or sodium methylate in solution in methanol or other of the basic condensation agents listed above in the anhydrous solvents listed above.

The starting α,β-ethylenic ketones or esters of the Formula III

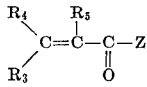

are well known in the art. Among these compounds are the esters, ethyl acrylate, methyl methacrylate, ethyl β,β-dimethylacrylate, benzyl crotonate, butyl methacrylate, methyl crotonate, phenyl cinnamate, ethyl cinnamate, ethyl β-phenylcrotonate, methyl β,β-diphenylacrylate, methyl β-cyclohexanyl-acrylate, methyl o-methoxy-cinnamate, ethyl o-chlorocinnamate, etc.; and the ketones, mesityl oxide, 1,3-diphenyl-1-oxo-2-propene, 1,4-diphenyl-2-oxo-3-butene, etc.

The starting sulfones II of the Formula II

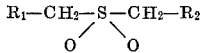

are also well known in the art. Among these compounds are dimethyl sulfone, diethyl sulfone, methyl-ethyl sulfone, dibenzyl sulfone, p-chlorobenzyl-methyl sulfone, o-methoxybenzyl-methyl sulfone, p-methylbenzyl-methyl sulfone, the aliphatic unsaturated sulfones, such as methyl-(3-methyl-2-butenyl)-sulfone, methyl - (2 - propenyl)-sulfone, etc.

The starting sulfones II can be prepared by oxidation of the corresponding sulfides, which themselves can be obtained by the action of an alkali metal mercaptide on a halogenated derivative. One example of this preparation is described in the experimental part for the preparation of methyl-(3-methyl-2-butenyl)-sulfone.

The following examples illustrate the invention without however limiting it.

Preparation: methyl-(3-methyl-2-butenyl)-sulfone

Step A: methyl-(3-methyl - 2 - butenyl)-sulfide.—50.5 gm. of sodium methyl sulfide containing 50% of water were introduced into 90 cc. of water, then at room temperature over a period of 30 minutes, 36 gm. of 2-methyl-2-butenyl bromide were added and the formation of two phases was observed.

When the addition was terminated, the reaction mixture was heated for a period of a half hour at a temperature of 80° C.

Next the reaction mixture was cooled. The aqueous phase which was saturated with sodium chloride was decanted, then extracted with ether. The organic phase of the reaction mixture and that resulting from the extraction were combined, washed with saturated salt solution and the solvent removed. The mixture was dried, rectified under vacuum (at about 50 mm.) and 23.575 gm. of methyl-(3-methyl-2-butenyl)-sulfide was obtained having a boiling point of 66° C. (under 40–50 mm. Hg).

The product is colorless, very slightly soluble in water, soluble in most of the usual orgnaic solvents.

*Analysis.*—$C_6H_{12}S$: molecular weight—116.23. Calculated (percent): C, 61.99; H, 10.41. Found (percent): C, 61.8; H, 10.2.

This compound is not described in the literature.

Step B: methyl-(3-methyl-2-butenyl)-sulfone.—36 cc. of an aqueous solution containing 110 volumes of hydrogen peroxide were very slowly added while agitating to 20 gm. of methyl-(3-methyl-2-butnyl)-sulfide, cooled by a bath of methanol and ice, and the reaction mixture was allowed to stand for a period of one hour at 0° C. The temperature of the reaction mixture was next allowed to return to room temperature, then the water was removed as fast as possible by azeotropic distillation with benzene. Thereafter the reaction mixture was evaporated and an oil was recovered which was crystallized by trituration in 1.5 volumes of isopropyl ether.

The crystals were filtered, washed with isopropyl ether and dried under vacuum without heating. 21.57 gm. of methyl-(3-methyl-2-butenyl)-sulfone were obtained having a melting point of 56–58° C.

This product is insoluble in water and soluble in the usual organic solvents.

*Analysis.*—$C_6H_{12}SO_2$; molecular weight—148.23. Calculated (percent): C, 48.61; H, 8.16; S, 21.63. Found (percent): C, 48.7; H, 7.9; S, 20.9.

This compound is not described in the literature.

EXAMPLE I

Preparation of 2-isobutenyl-3,3,5-trimethyl-5-hydroxy-tetrahydrothiapyran-1,1-dioxide

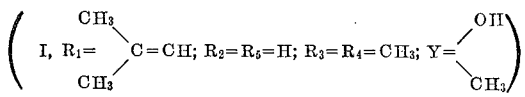

5.19 gm. of potassium t.-butylate were dissolved in 30 cc. of anhydrous tetrahydrofuran. Then 3.37 gm. of methyl-(3-methyl - 2 - butenyl) - sulfone were introduced therein and the mixture was agitated for a period of 15 minutes. The mixture was then cooled on an ice bath and, drop by drop, 25 gm. of anhydrous mesityl oxide (III, $R_3$—$R_4$—$CH_3$; $R_5$—H; Z—$CH_3$) was added. then the reaction mixture was allowed to stand for a period of 4 hours and thereafter it was acidified to a pH of 1 to 2 by the addition of a 2 N hydrochloric acid solution. The acidified solution was extracted with ther. The organic phase was washed with a sodium bicarbonate solution, then with water, dried and evaporated to dryness.

The residue obtained, crystallized from isopropyl ether, gave 2-isobutenyl-3,3,5-trimethyl - 5 - hydroxytetrahydrothiapyran-1,1-dioxide having a melting point of 186° C.

The product occurs in the form of colorless crystals, insoluble in water, slightly soluble in ether, and soluble in acetone, benzene and chloroform.

*Analysis.*—$C_{12}H_{22}O_3S$; molecular weight—246.36. Calculated (percent): C, 58.5; H, 9.00; S, 13.02. Found (percent): C, 58.5; H, 9.2; S, 12.1 and 12.2.

EXAMPLE II

Prepration of 2-isobutenyl-3,5-diphenyl-5-hydroxy-tetrahydrothiapyran-1,1-dioxide

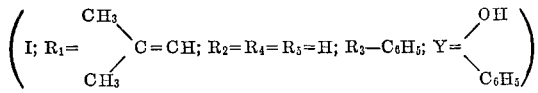

(I; $R_1= \begin{matrix}CH_3\\CH_3\end{matrix}\!\!>\!\!C=CH$; $R_2=R_4=R_5=H$; $R_3=C_6H_5$; $Y=\!\!<\!\!\begin{matrix}OH\\C_6H_5\end{matrix}$)

Step A: 1,3-diphenyl-1-oxo-6-methyl - 4 - (methyl sulfonyl)-5heptene

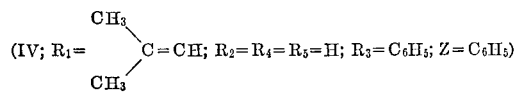

(IV; $R_1= \begin{matrix}CH_3\\CH_3\end{matrix}\!\!>\!\!C=CH$; $R_2=R_4=R_5=H$; $R_3=C_6H_5$; $Z=C_6H_5$)

1.153 gm. of potassium t-butylate were dissolved in 15 cc. of anhydrous tetrahydrofuran. Then 6.11 gm. of methyl-(3-methyl-2-butenyl)-sulfone were introduced and the reaction mixture was agitated for a period of 15 minutes at a temperature of 0° C. under an atmosphere of nitrogen. Next 8.6 gm. of 1,3-diphenyl-1-oxo-2-propene (III, $R_3$—$C_6H_5$; $R_4$—$R_5$—H; Z—$C_6H_4$) were added and the reaction mixture was allowed to stand for a period of a half hour at 0° C. Thereafter the reaction mixture was poured into water containing sodium chloride and extracted with ether. The organic phase was washed with an aqueous solution of sodium chloride and dried. The solvent was removed by evaporation and the residue was crystallized from a mixture of ether and isopropyl ether (1:1).

1,3-diphenyl-1-oxo-6-methyl - 4 - (methyl sulfonyl)-5-heptene was thus obtained having a melting point of 122° C.

This product occurred in the form of colorless crystals, insoluble in water, slightly soluble in ether, and soluble in alcohol, acetone, benzene and chloroform.

*Analysis.*—$C_{21}H_{24}S_3$; molecular weight—356.46. Calculated (percent): C, 70.75; H, 6.78; S, 8.99. Found (percent): C, 70.7; H, 6.9; S, 9.0.

This compound is not described in the literature.

Step B: 2-isobutenyl-3,5-diphenyl-5-hydroxytetrahydrothiapyran-1,1-dioxide.—2.2 gm. of 1,3-diphenyl - 1 - oxo-6-methyl-4-(Methyl sulfonyl)-5-heptene were added to a solution of 0.72 gm. of potassium t.-butylate in 10 cc. of anhydrous tetrahydrofuran. The reaction mixture was next agitated under an atmosphere of nitrogen for a period of 30 minutes at a temperature of 0° C. Thereafter the reaction mixture was diluted with an aqueous solution of sodium chloride and extracted with ether. The organic phase was washed with water, dried and the solvent was removed.

The residue obtained, crystallized from a mixture of ether and isopropyl ether, gave 2-isobutenyl-3,5-diphenyl-5-hydroxy-tetrahydrothiapyran-1,1-dioxide having a melting point of 188° C.

This product occurs in the form of colorless small rods, insoluble in water, slightly soluble in ether and soluble in alcohol, benzene, chloroform and acetone.

*Analysis.*—$C_{21}H_{25}O_3S$; molecular weight—356.46. Calculated (percent): C, 70.75; H, 6.78; S, 8.99. Found (percent): C, 70.5; H, 6.7; S, 8.9.

This compound is not described in the literature.

2 - isobutenyl - 3,5 - diphenyl - 5 - hydroxy - tetrahydrothiapyran-1,1-dioxide can be directly obtained by condensing methyl-(3-methyl-2-butenyl)-sulfone with 1,3-diphenyl-1-oxo-2-propane and by operating in a solution of potassium t.-butylate in tetrahydrofuran. In order to accomplish this, one utilizes more than a molar equivalent of potassium t.-butylate with reference to the starting products taken in equimolecular amounts.

EXAMPLE III

Mixture of the two $\Delta^3$ and $\Delta^4$ isomers of 2-isobutenyl-3,5-diphenyl-dihydrothiapyran-1,1-dioxide 1 gm. of 2-isobutenyl-3,5-diphenyl-5-hydroxytetrahydrothiapyran-1,1-dioxide, obtained from the preceding example, was heated on a molten metal bath at a temperature of 200–220° C. for a period of 30 minutes. After cooling, the mixture was taken up with methylene chloride, washed with water and dried. The solvent was removed. The resin obtained was crystallized by the addition of ether and had a melting point of about 150° C. This compound is a mixture of the two $\Delta^3$ and $\Delta^4$ isomers of 2-isobutenyl - 3,5 - diphenyl - dihydrothiapyran - 1,1-dioxide.

*Analysis.*—$C_{21}H_{22}O_2S$; molecular weight—338.46. Calculated (percent): C, 74.52; H, 6.55; S, 9.47. Found (percent): C, 74.7; H, 6.6; S, 9.7.

One of these two isomers can be isolated by chromatography through alumina and recrystallization from a mixture of methylene chloride and methanol chloride and methanol. The isomer isolated has a melting point of 187° C.

This compound is not described in the literature.

EXAMPLE IV

Preparation of 2-isobutenyl-3-dimethyl-5-oxo-tetrahydrothiapyran-1,1-dioxide

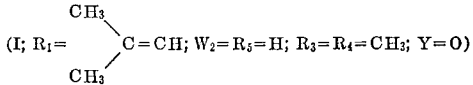

(I; $R_1= \begin{matrix}CH_3\\CH_3\end{matrix}\!\!>\!\!C=CH$; $W_2=R_5=H$; $R_3=R_4=CH_3$; $Y=O$)

A solution of 4.85 gm. of potassium t.-butylate in 30 cc. of anhydrous tetrahydrofuran was cooled to 0° C. Then 2.13 gm. of methyl-(3-methyl-2-butenyl)-sulfone was introduced and the reaction mixture was agitated at 0° C. for a period of 10 minutes under an atmosphere of nitrogen. Next 2.7 gm. of ethyl β,β-dimethyl acrylate (III; $R_3$—$R_4$—$CH_3$; $R_5$—H; Z—$OC_2H_5$) were added and the reaction mixture was allowed to stand for a period of several hours at room temperature. Then the reaction mixture was heated to reflux for a period of 15 minutes.

Next the reaction mixture was cooled to a temperature of —10° C. and an aqueous solution of sodium chloride was added thereto. Thereafter, a 2 N solution of hydrochloric acid was added and the mixture was extracted with ether. The organic phase was washed with a solution of sodium bicarbonate and then with a solution of sodium chloride, dried and the solvent evaporated. The residue obtained was crystallized by a mixture of methylene chloride and methanol and gave 2-isobutenyl-3,3-dimethyl-5-oxo-tetrahydrothiapyran - 1,1 - dioxide having a melting point of 186° C.

This product occurs in the form of colorless crystals, insoluble in water and ether and slightly soluble in alcohol and benzene.

*Analysis.*—$C_{11}H_{18}O_3S$; molecular weight—230.31. Calculated (percent): C, 57.30; H, 7.88; S, 13.92. Found (percent): C, 57.4; H, 7.9; S, 13.7.

This compound is not described in the literature.

The 2-isobutenyl - 3,3 - dimethyl-5-oxo-tetrahydrothiapyran-1,1-dioxide furnished a 2,4-dinitrophenylhydrazone in the form of yellow crystals melting at 215° C.

EXAMPLE V

Preparation of 2-isobutenyl-3-phenyl-5-oxo-tetrahydrothiapyran-1,1-dioxide

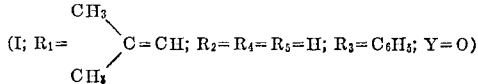

(I; $R_1= \begin{matrix}CH_3\\CH_3\end{matrix}\!\!>\!\!C=CH$; $R_2=R_4=R_5=H$; $R_3=C_6H_5$; $Y=O$)

A solution of 4.325 gm. of potassium t.-butylate in 25 cc. of anhydrous tetrahydrofuran was cooled to a temperature of —5° C. Then 2.03 gm. of methyl-(3-methyl-2-butenyl)-sulfone was introduced and the mixture was agitated for a period of 20 minutes under an atmosphere of nitrogen at a temperature of 0° C.

Next 2.7 gm. of ethyl cinnamate (III; $R_3$—$C_6H_5$; $R_4$—$R_5H$; Z—$OC_2H_5$) were added. The reaction mixture was maintained under agitation for a period of 3 hours at room temperature, then added to an iced 2 N hydrochloric acid solution. The acidifier mixture was extracted with methylene chloride. The organic phase washed with sodium bicarbonate solution and then with water, dried, and the solvent removed.

A residue was recovered which was crystallized from ether and 2-isobutenyl - 3 - phenyl-5-oxo-tetrahydrothiapyran-1,1-dioxide was obtained having a melting point of 162° C.

This product occurred in the form of colorless crystals insoluble in water, slightly soluble in ether and soluble in benzene and chloroform.

*Analysis.*—$C_{15}H_{18}O_3S$; molecular weight—278.35. Calculated (percent): C, 64.72; H, 6.52; S, 11.52. Found (percent): C, 64.8; H, 6.6; S, 11.3.

This compound is not described in the literature.

EXAMPLE VI

Preparation of 2-isobutenyl-3-methyl-5-oxo tetrahydrothiapyran-1,1-dioxide

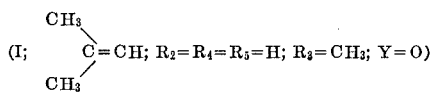

(I; $R_2=R_4=R_5=H$; $R_3=CH_3$; $Y=O$)

A solution of 4.36 gm. of potassium t.-butylate in 25 cc. of anhydrous tetrahydrofuran was cooled to 0° C. Then 2.3 gm. of methyl-(3-methyl - 2 - butenyl)-sulfone were added and the reaction mixture was agitated for a period of 20 minutes under an atmosphere of nitrogen.

Next 1.55 gm. of methyl crotonate (III; $R_3$—$CH_3$; $R_4$—$R_5$—H; Z—$OCH_3$) were added. The reaction mixture was agitated for a period of 2 hours at 0° C. and then added to an iced 2 N hydrochloric acid solution. This acidified solution was extracted with ether. The organic phase was washed with a solution of sodium bicarbonate, then with water and dried. The solvent was distilled and a residue was obtained.

Crystallization of the residue from ethyl accetate gave an isomer of 2-isobutenyl-3-methyl-5-oxo-tetrahydrothiapyran-1,1-dioxide having a melting point of 178° C.

This product occurs in the form of colorless prisms insoluble in water and ether, soluble in benzene and chloroform.

*Analysis.*—$C_{10}H_{16}O_3S$; molecular weight—216.29. Calculated (percent): C, 55.53; H, 7.46; S, 14.82. Found (percent): C, 55.6; H, 7.5; S, 14.6.

This product is not described in the literature.

This isomer, melting at 178° C., furnished a 2,4-dinitrophenyl-hydrazone in the form of yellow crystals melting at 222° C.

Chromatography through alumina of the mother liquors occurring from the crystallization of the preceding sulfone (the isomer having a melting point of 178° C.) with elution with benzene, then crystallization from ether gave the other isomer of 2-isobutenyl-3-methyl-5-oxo-tetrahydrothiapyran-1,1-dioxide having a melting point of 105° C.

This product occurs in the form of colorless prisms, insoluble in water, soluble in ether and most of the usual organic solvents.

*Analysis.*—$C_{10}H_{16}O_3S$; molecular weight—216.29. Calculated (percent): C, 55.53; H, 7.46; S, 14.82. Found (percent): C, 55.8; H, 7.5; S, 14.4.

This compound is not described in the literature.

This isomer, having a melting point of 105° C., gave a 2,4-dinitrophenyl-hydrazone in the form of yellow crystals having a melting point of 237° C.

EXAMPLE VII

Preparation of 1-phenyl-3-oxo-4-(methylsulfonyl)-1-butene (V; $R_1$—$R_2$—$R_4$—$R_5$—H; $R_3$—$C_6H_5$)

7.25 gm. of potassium t.-butylate were dissolved in 30 cc. of anhydrous tetrahydrofuran. Then at room temperature 2.43 gm. of dimethylsulfone (II; $R_1$—$R_2$—H) were added and the reaction mixture was agitated for a period of 15 minutes under an atmosphere of nitrogen. Next 4.56 gm. of anhydrous ethyl cinnamate (III; $R_3$—$C_6H_5$; $R_4$—$R_5$—H) were introduced and the reaction mixture was maintained for a period of 4 hours at room temperature. Thereafter the reaction mixture was iced, acidified, by the addition of a 2 N hydrochloric acid solution and extracted with ether. The organic phase was washed by a solution of sodium bicarbonate, then by water. Thereafter the organic phase was dried and the solvent was removed.

The residue obtained, crystallized from ether, gave 1-phenyl-3-oxo-4-(methylsulfonyl)-1-butene having a melting point of 94° C.

The product occurs in the form of small colorless prisms, insoluble in water, slightly soluble in alcohol and soluble in chloroform.

*Analysis.*—$C_{11}H_{12}O_3S$; molecular weight—224.27. Calculated (percent): C, 58.91; H, 5.4; S, 14.29. Found (percent): C, 59.1; H, 5.6; S, 14.2.

This compound is not described in the literature.

EXAMPLE VIII

Preparation of 3 - phenyl-5-oxo-tetrahydrothiapyran-1,1-dioxide (I: $R_1$—$R_2$—$R_4$—$R_5$—H; $R_3$—$R_6H_5$; Y—O)

To a solution of sodium methylate in methanol, prepared starting from 0.19 gm. of sodium and 15 cc. of methanol, were added 1.5 gm. of 1-phenyl - 3 - oxo-4-(methylsulfonyl)-1-butene and the reaction mixture was heated to reflux under an atmosphere of nitrogen for a period of 16 hours. Thereafter the methanol was removed under vacuum. The reaction mixture was acidified by a 2 N hydrochloric acid solution and the acidified mixture was extracted with methylene chloride. The combined organic layers were washed with an aqueous solution of sodium bicarbonate, then with water and dried. Next the solution was distilled to dryness and the residue thus isolated was crystallized by the addition of methanol.

There was obtained in this fashion 3 - phenyl-5-oxo-tetrahydrothiapyran-1,1-dioxide having a melting point of 244° C.

The product occurs in the form of colorless microprisms solvated with methylene chloride. The crystals were insoluble in water, alcohol, ether, acetone and benzene and very slightly soluble in chloroform.

This compound is not described in the literature.

The preceding specific embodiments are illustrative of the invention. It is to be understood, however, that other expendients known to those skilled in the art may be employed without departing from the spirit of the invention or the scope of the appended claims.

We claim:
1. A linear sulfone of the formula

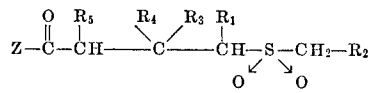

wherein $R_1$ and $R_2$ are members selected from the group consisting of hydrogen, lower-$\Delta^1$-alkenyl, phenyl, lower-alkyl-phenyl, halophenyl and lower-alkoxy-phenyl; $R_3$ and $R_4$ are members selected from the group consisting of hydrogen, lower alkyl, phenyl, phenyl-lower-alkyl, lower-alkyl-phenyl, halophenyl, lower-alkoxy-phenyl and cycloalkyl having from three to seven carbon atoms; $R_5$ is hydrogen; and Z is a member selected from the group consisting of R and OR, wherein R is a member selected from the group consisting of lower alkyl, phenyl-lower-alkyl and phenyl.

2. 1,3-diphenyl - 1 - oxo-6-methyl-4-methylsulfonyl-5-heptene.

3. A linear sulfone of the formula

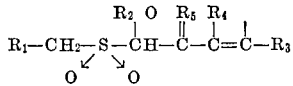

wherein $R_1$ and $R_2$ are members selected from the group consisting of hydrogen, lower-$\Delta^1$-alkenyl, phenyl, lower-alkyl-phenyl, halophenyl and lower-alkoxy-phenyl: $R_3$ and $R_4$ are members selected from the group consisting of hydrogen, lower alkyl, phenyl, phenyl-lower-alkyl, lower-alkyl-phenyl, halophenyl, lower-alkoxy-phenyl and cycloalkyl having from three to seven carbon atoms; $R_5$ is hydrogen.

4. 1-phenyl-3-oxo-4-methylsulfonyl-1-buten.

References Cited
UNITED STATES PATENTS

| | | | |
|---|---|---|---|
| 2,338,728 | 1/1944 | McNally et al. | 260—327 |
| 2,010,828 | 8/1935 | Rothrock | 260—590 |

DANIEL D. HORWITZ, Primary Examiner

U.S. Cl. X.R.

260—327, 607, 609, 468, 593, 470, 479, 481, 45.95, 999